United States Patent
Moriuchi et al.

(10) Patent No.: US 9,092,693 B2
(45) Date of Patent: Jul. 28, 2015

(54) IMAGE PROCESSING APPARATUS AND METHOD

(71) Applicant: KABUSHIKI KAISHA TOSHIBA, Tokyo (JP)

(72) Inventors: Yusuke Moriuchi, Kawasaki (JP); Toshimitsu Kaneko, Kawasaki (JP); Kanako Saito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 13/920,478

(22) Filed: Jun. 18, 2013

(65) Prior Publication Data

US 2013/0336586 A1 Dec. 19, 2013

(30) Foreign Application Priority Data

Jun. 18, 2012 (JP) .................................. 2012-136705

(51) Int. Cl.
  *G06K 9/46* (2006.01)
  *G06K 9/00* (2006.01)

(52) U.S. Cl.
  CPC .......... *G06K 9/4661* (2013.01); *G06K 9/00362* (2013.01)

(58) Field of Classification Search
  CPC .......... G06K 15/00; G06K 17/00; G06K 9/20
  USPC ............. 382/128, 170, 190, 195; 385/27, 140
  See application file for complete search history.

(56) References Cited

U.S. PATENT DOCUMENTS

| 6,332,055 | B1 * | 12/2001 | Hatayama et al. | 385/140 |
| 6,633,697 | B2 * | 10/2003 | Emori et al. | 385/27 |
| 2009/0252389 | A1 * | 10/2009 | Yamaguchi | 382/128 |
| 2013/0336586 | A1 * | 12/2013 | Moriuchi et al. | 382/170 |

FOREIGN PATENT DOCUMENTS

JP 4831632 9/2011

OTHER PUBLICATIONS

R.R. Anderson et al., "The Optics of Human Skin", Journal of Investigative Dermatology, vol. 77(1), pp. 13-19, 1981.
T. Mita et al., "Joint Haar-like Features for Face Detection", IEEE International Conference on Computer Vision, 2005, 8 pages.
S.L. Phung et al., "Skin Segmentation Using Color Pixel Classification: Analysis and Comparison", IEEE Translations on Pattern Analysis and Machine Intelligence 27 (1), pp. 148-154, 2005.

* cited by examiner

*Primary Examiner* — Amir Alavi
(74) *Attorney, Agent, or Firm* — Nixon & Vanderhye, P.C.

(57) ABSTRACT

According to one embodiment, an image processing apparatus includes following units. The extraction unit extracts, from image data including a plurality of pixels, wavelength signal values of the plurality of pixels. The light attenuation amount calculation unit calculates a light attenuation amount based on a ratio of a wavelength signal value of a target pixel to a representative signal value obtained from wavelength signal values of a local region around the target pixel. The pigment amount calculation unit calculates a pigment amount of a predetermined pigment component at the target pixel by resolving the light attenuation amount using an absorbance base of the predetermined pigment component.

19 Claims, 8 Drawing Sheets

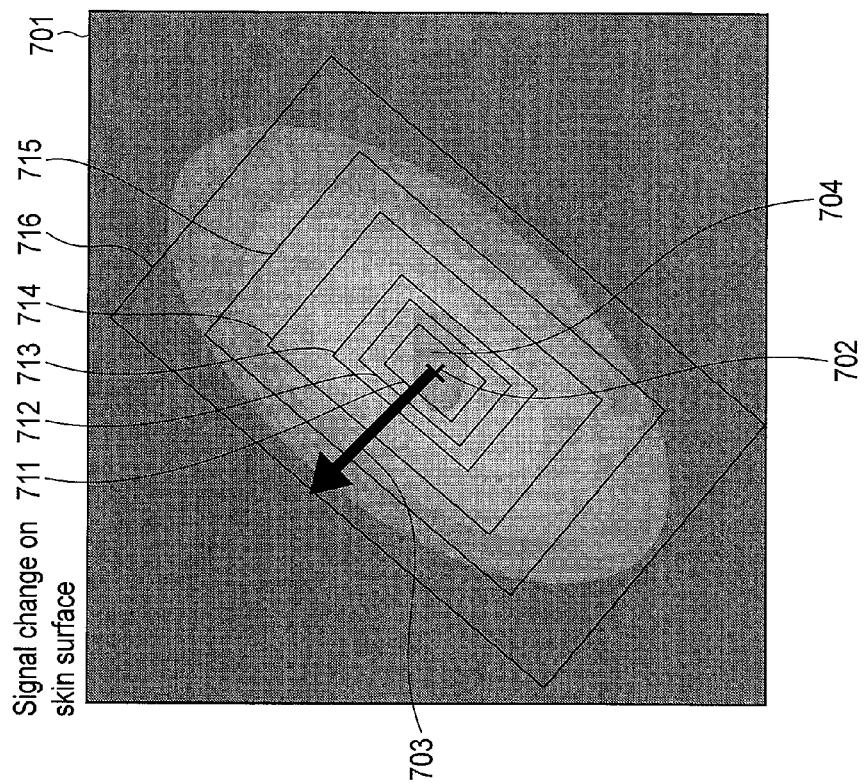
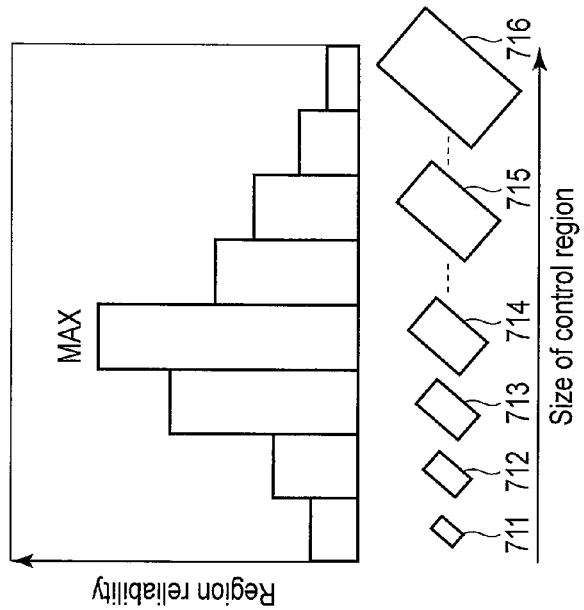
FIG. 7A
FIG. 7B

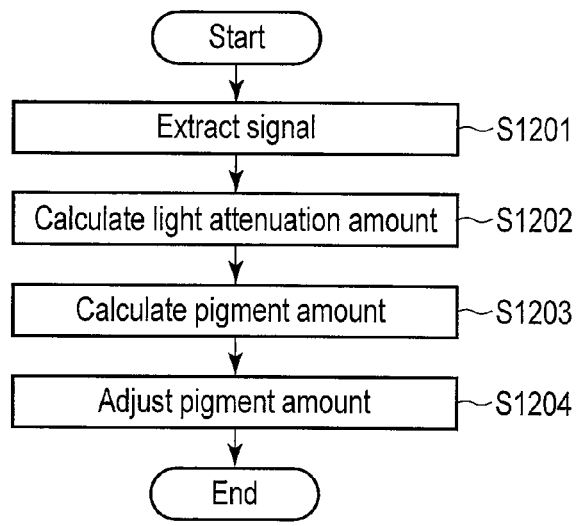
F I G. 12
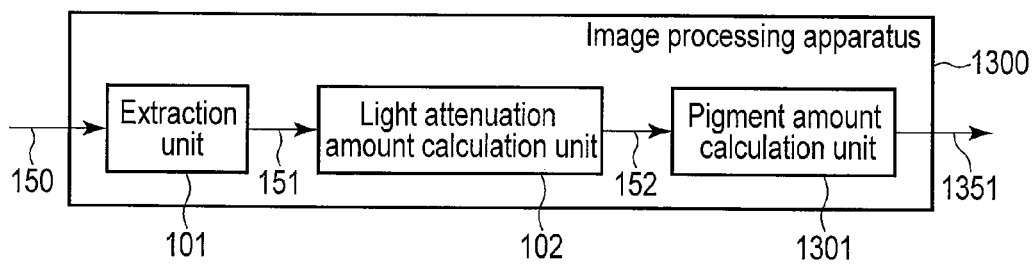
F I G. 13
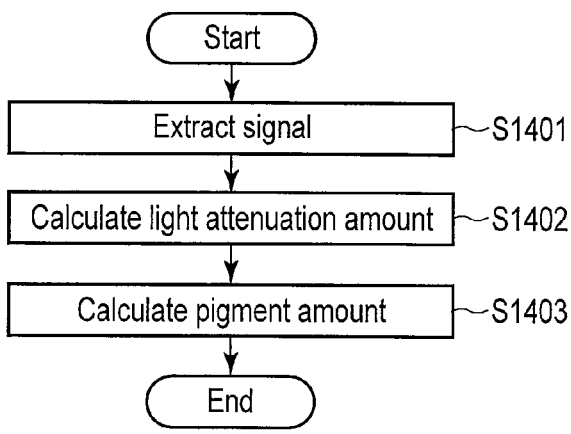
F I G. 14

IMAGE PROCESSING APPARATUS AND METHOD

CROSS-REFERENCE TO RELATED APPLICATIONS

This application is based upon and claims the benefit of priority from Japanese Patent Application No. 2012-136705, filed Jun. 18, 2012, the entire contents of which are incorporated herein by reference.

FIELD

Embodiments described herein relate generally to an image processing apparatus and method.

BACKGROUND

There is an image processing apparatus for estimating, from image data, the amount of a pigment component accumulated in human skin. In this image processing apparatus, the image capturing environment at the time of capturing image data needs to be known in order to estimate a pigment component amount.

Against this backdrop, there has arisen a demand for an image processing apparatus capable of estimating the amount of a pigment component accumulated in human skin from image data captured under a general environment where the image capturing environment is unknown.

BRIEF DESCRIPTION OF THE DRAWINGS

FIG. 7A is a view for explaining a method of setting a control region;

FIG. 7B is a view showing the relationship between a control region and region reliability;

FIG. 12 is a flowchart showing an example of the operation of the image processing apparatus shown in FIG. 11;

FIG. 13 is a block diagram schematically showing an image processing apparatus according to the fifth embodiment;

FIG. 14 is a flowchart showing an example of the operation of the image processing apparatus shown in FIG. 13.

DETAILED DESCRIPTION

In general, according to one embodiment, an image processing apparatus includes an extraction unit, a light attenuation amount calculation unit, and a pigment amount calculation unit. The extraction unit is configured to extract, from image data including a plurality of pixels, wavelength signal values of the plurality of pixels. The light attenuation amount calculation unit is configured to calculate a light attenuation amount based on a ratio of a wavelength signal value of a target pixel to a representative signal value obtained from wavelength signal values of a local region around the target pixel. The pigment amount calculation unit is configured to calculate a pigment amount of a predetermined pigment component at the target pixel by resolving the light attenuation amount using an absorbance base of the predetermined pigment component.

Hereinafter, various embodiments will be described with reference to the accompanying drawing as needed. In the embodiments, like reference numbers denote like elements, and duplicate descriptions are omitted.

(First Embodiment)

Figure 1:
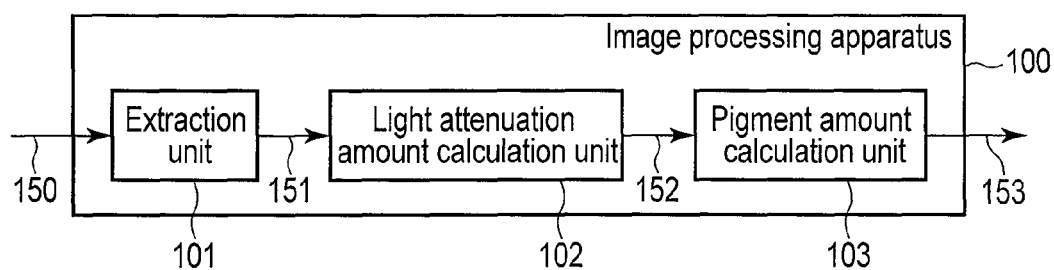
FIG. 1 is a block diagram schematically showing an image processing apparatus according to the first embodiment.

FIG. 1 schematically illustrates an image processing apparatus 100 according to a first embodiment. The image processing apparatus 100 acquires, from an external apparatus (not shown), image data 150 which is an image content including a human skin region, and calculates and outputs a pigment amount 153 of a predetermined pigment component for each of pixels included in the image data 150. The pigment amount represents the amount of a pigment component accumulated in the skin of an object, that is, the accumulation amount of the pigment component. Examples of the pigment components of skin include a melanin pigment, an oxy-hemoglobin pigment, a deoxy-hemoglobin pigment, and a bilirubin pigment. Specifically, the image processing apparatus 100 includes an extraction unit 101, a light attenuation amount calculation unit (or a light attenuation amount calculator) 102, and a pigment amount calculation unit (or a pigment amount calculator) 103, as shown in FIG. 1.

In the image processing apparatus 100, the image data 150 is supplied to the extraction unit 101. The image data 150 can be moving image data including a plurality of frame images, for example, moving image data captured by a video camera or moving image data received by a TV set, or still image data including a single frame image, for example, still image data captured by a digital camera. When the image data 150 is moving image data, the image processing apparatus 100 performs image processing for each frame image. In the present embodiment, the description will be made assuming that the image data 150 is still image data.

The extraction unit 101 extracts wavelength signal values 151 of respective pixels of the image data 150, from the image data 150. Each wavelength signal value 151 includes a red (R) signal value, a green (G) signal value, and a blue (B) signal value. The wavelength signal values 151 are passed to the light attenuation amount calculation unit 102.

The light attenuation amount calculation unit 102 calculates a light attenuation amount 152 at a target pixel position based on the ratio of the wavelength signal value of a pixel to be processed (to be referred to as a target pixel hereinafter) of the image data 150 to the representative signal value of a local region around the target pixel. The light attenuation amount represents the amount of light that attenuates when the light that has struck an object is reflected. Light amount attenuation on human skin takes place because of light absorption by a pigment component accumulated in the skin, light scattering on the skin surface, and the like. The light attenuation amount 152 is passed to the pigment amount calculation unit 103.

The pigment amount calculation unit 103 resolves the light attenuation amount 152 using the absorbance base of a predetermined pigment component, thereby calculating the pigment amount 153 of the predetermined pigment component at the target pixel position. The predetermined pigment component represents the pigment component for which pigment amount estimation is desired. In the present embodiment, the number of predetermined pigment components is 1, 2, or 3. The pigment amount is calculated for each of the predetermined pigment components. The absorbance base of each pigment component is determined in advance by the molar extinction coefficient of the pigment component and the spectral sensitivity characteristic of an assumed camera.

The image processing apparatus 100 having the above-described arrangement can estimate the pigment amount of a predetermined pigment component accumulated in human skin from image data captured under a general environment where the image capturing environment is unknown.

Next, the operation of the image processing apparatus 100 will be explained.

Figure 2:
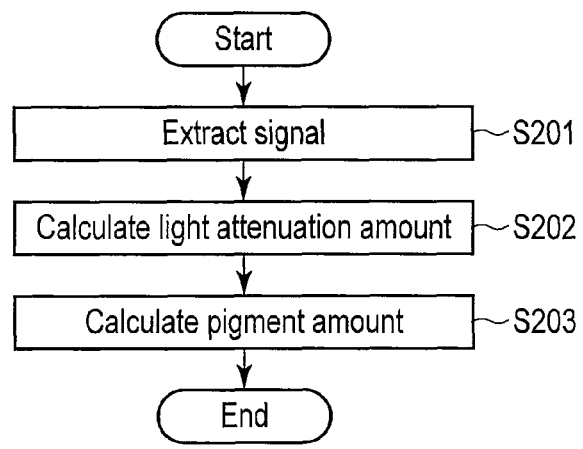
FIG. 2 is a flowchart showing an example of the operation of the image processing apparatus shown in FIG. 1.

FIG. 2 illustrates an example of the operation of the image processing apparatus 100. In step S201, the extraction unit 101 extracts, from the input image data 150, the wavelength signal values 151 of the respective pixels of the image data 150. The image data 150 can have an RGB format, a YUV format, or any other signal format. If the image data 150 is γ-corrected RGB data, the extraction unit 101 performs inverse γ-correction for the RGB signals of the image data 150, thereby converting them into linear RGB signals. If the image data 150 is γ-corrected YUV data, the extraction unit 101 converts the YUV signals into RGB signals using a predetermined transformation formula, and performs inverse γ-correction for the RGB signals obtained by conversion. The wavelength signal value 151 of the present embodiment corresponds to the linearized RGB signals.

In the present embodiment, processes in steps S202 and S203 following step S201 are executed sequentially for all pixels of the image data 150. Specifically, one pixel is selected from the image data 150 as a target pixel, and the processes in steps S202 and S203 are executed for the target pixel. Subsequently, another pixel is selected from the image data 150 as a target pixel, and the processes in steps S202 and S203 are executed for the target pixel. The processes in steps S202 and S203 are executed sequentially for all pixels of the image data 150 in the above-described way. Alternatively, after the process in step S202 is executed sequentially for all pixels of the image data 150, the process in step S203 may be executed sequentially for all pixels of the image data 150.

In step S202, the light attenuation amount calculation unit 102 calculates the light attenuation amount 152 at the target pixel position from the wavelength signal values 151 obtained in step S201. Specifically, the light attenuation amount calculation unit 102 acquires the wavelength signal value of the target pixel, and determines the representative signal value (to also simply be referred to as a representative value) of a local region around the target pixel. For example, the local region is a square or rectangular region centered around the target pixel, and includes a plurality of pixels. As the representative signal value, it is possible to use the average value of the wavelength signal values of the pixel set in the local region. Alternatively, the representative signal value may be the median value of the wavelength signal values of the pixels in the local region or the peak value of a histogram. To set the pixel set, either of two methods to be exemplified below or any other method is usable. In a first method, all the pixels included in the local region are used as the pixel set. In a second method, the pixels in the local region are classified into a plurality of partial regions. A partial region to which the pixel having the media value belongs is selected, and all the pixels included in the selected partial region are used as the pixel set. To classify the pixels of the local region in the second method, it is possible to use a known clustering method such as the k-NN method, the Ward method, or the k-means method. Note that an R signal value that is little affected by the pigment components of skin is preferably used for clustering.

Next, the light attenuation amount calculation unit 102 calculates the light attenuation amount at the target pixel position based on the ratio of the wavelength signal value of the target pixel to the representative signal value of the local region around the target pixel. The light attenuation amount can be calculated by, for example, equations (1)

$$\begin{cases} A_{R_i} = -\log_{10}(R_i/R_{ave}) \\ A_{G_i} = -\log_{10}(G_i/G_{ave}) \\ A_{B_i} = -\log_{10}(B_i/B_{ave}), \end{cases} \quad (1)$$

$$A_i = (A_{R_i}, A_{G_i}, A_{B_i}) \quad (2)$$

$$Y_i = (R_i, G_i, B_i) \quad (3)$$

$$Y_{ave} = (R_{ave}, G_{ave}, B_{ave}) \quad (4)$$

where a vector $A_i$ given by equation (2) represents the light attenuation amount, a vector $Y_i$ given by equation (3) represents the wavelength signal value of the target pixel, and a vector $Y_{ave}$ given by equation (4) represents the representative signal value. The first, second, and third elements of these vectors correspond to the components in the red, green, and blue wavelength ranges, respectively. For example, $R_i$, $G_i$, and $B_i$ that are the elements of the vector $Y_i$ represent the R signal value, the G signal value, and the B signal value of a target pixel i, respectively.

The procedure of deriving equations (1) will be described here.

The wavelength signal values that are linearized RGB signals are output signals (camera signals) acquired from a camera. Using a wavelength λ, the camera signal $Y_i$ at the pixel position i can be expressed by $$\begin{bmatrix} R_i \\ G_i \\ B_i \end{bmatrix} = \int vis R_i(\lambda) \cdot \prod_{j=1}^{N}(k_{ji}P_j(\lambda)) \cdot \begin{bmatrix} \bar{r}_R(\lambda) \cdot WB_R \\ \bar{r}_G(\lambda) \cdot WB_G \\ \bar{r}_B(\lambda) \cdot WB_B \end{bmatrix} d\lambda, \quad (5)$$

$$r = (\bar{r}_R(\lambda), \bar{r}_G(\lambda), \bar{r}_B(\lambda)) \quad (6)$$

$$WB = (WB_R, WB_G, WB_B) \quad (7)$$

where $R_i(\lambda)$ in equation (5) is the spectral reflectance of the skin that is the measurement object at the pixel position i, N is the number of illuminations (or light sources) existing in the image capturing environment, $P_j(\lambda)$ is the spectral distribution of the jth illumination, and $k_{ji}$ is the coefficient representing the intensity of light that is emitted by the jth illumination to irradiate the pixel position i. In this case, j is an integer satisfying 1≤j≤N. In addition, a vector r given by equation (6) represents the coefficient of the spectral sensitivity of the camera. A vector WB given by equation (7) represents the coefficient of white balance of the camera. The first, second, and third elements of these vectors correspond to the components in the red, green, and blue wavelength ranges, respectively. Integration of equation (5) indicates the sum of products of the signal values in a visible light wavelength range (vis).

When estimating the pigment amount of a pigment component of skin from an observed camera signal, the spectral reflectance $R_i(\lambda)$ of the skin that is the measurement object needs to be estimated. However, the spectral reflectance of the skin estimated from the camera signal greatly varies depending on the individual difference of the skin of the object, the spectral distribution of illumination light at the time of image capturing, and the camera characteristics. Especially when adaptation to a general image captured under an unknown image capturing environment is considered, the illumination is rarely single, and the intensity and type of the illumination light change in accordance with the position of the object. For this reason, the estimated pigment amount of the pigment component varies in accordance with the position or part of the skin. In the present embodiment, a light reflection model to be described below is used to robustly estimate the pigment amount regardless of these variation factors. The light reflection model used in the present embodiment assumes that when light that has struck the skin is reflected, the incident light is affected by the pigment components accumulated in the skin at the pixel position i and attenuates because of absorption and scattering. This light reflection model assumes that when the molar extinction coefficients of M types of pigment components accumulated in the skin at the pixel position i are defined as $k_{1i}(\lambda), k_{2i}(\lambda), \ldots, k_{Mi}(\lambda)$, and the pigment amounts of the pigment components at the pixel position i are defined as $\alpha_{1i}(\lambda), \alpha_{2i}(\lambda), \ldots, \alpha_{Mi}(\lambda)$, the signals observed by the camera attenuate based on an absorption coefficient $A_i(\lambda)$, which is given by $$A_i(\lambda) = \sum_{k=1}^{M} \alpha_{ki} k_{ki}(\lambda) \quad (8)$$

where M is a natural number.

Figure 3:
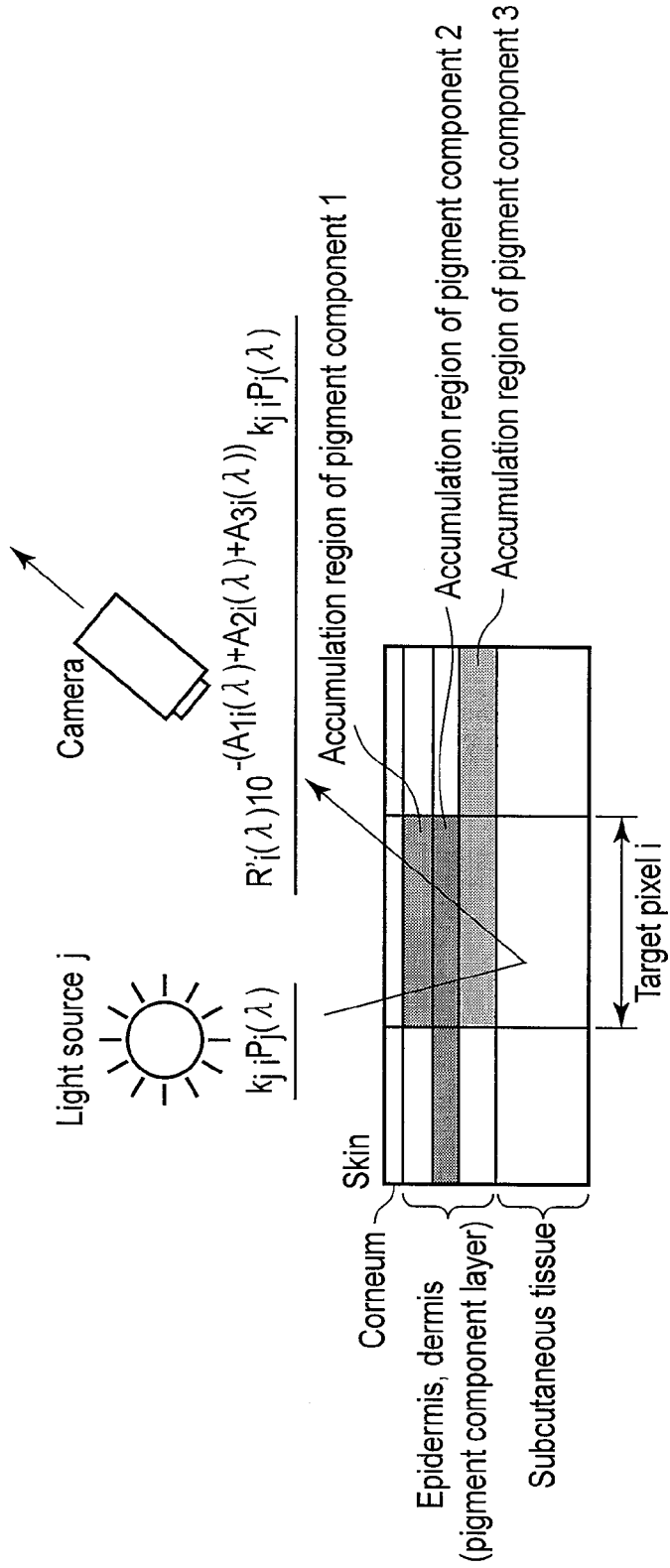
FIG. 3 is a view for explaining a state in which light is reflected by a skin surface.

The transmittance when passing through the layer of a pigment component having the absorption coefficient $A_i(\lambda)$ can be expressed as $10^{-A_i(\lambda)}$. Hence, the signal value obtained by observing, with the camera, the light that strikes the skin, attenuates through the layer of the pigment component accumulated in the skin at the pixel position i, and is reflected can be expressed as $$\begin{bmatrix} R_i \\ G_i \\ B_i \end{bmatrix} = \int vis R'_i(\lambda) \cdot 10^{-A_i(\lambda)} \cdot \prod_{j=1}^{N} (k_{ji} P_j(\lambda)) \cdot \begin{bmatrix} \bar{r}_R(\lambda) \cdot WB_R \\ \bar{r}_G(\lambda) \cdot WB_G \\ \bar{r}_B(\lambda) \cdot WB_B \end{bmatrix} d\lambda, \quad (9)$$

where $R_i'(\lambda)$ is the spectral reflectance of skin without a pigment component accumulated, and $A_i(\lambda)$ is the absorption coefficient of the pigment component accumulated in the skin at the pixel position i. Generally, $R_i'(\lambda)$ changes depending on the object and the measured part. FIG. 3 schematically shows light reflection on the skin surface. More specifically, FIG. 3 illustrates a state in which illumination light $P_j(\lambda)$ irradiates the skin at the pixel position i where three types of pigment components are accumulated, and the reflected light is observed by the camera. As shown in FIG. 3, the skin includes corneum, epidermis, dermis, and subcutaneous tissue, as shown in FIG. 3. The pigment components are accumulated in the epidermis and dermis. The epidermis and dermis will be referred to as a pigment component layer altogether. Light from a light source j is reflected by the skin, and the reflected light is observed by the camera. The reflected light includes the light reflected by the pigment component layer and that reflected by the subcutaneous tissue. The reflected light is, for example, absorbed by the pigment components and thus attenuates through the pigment component layer.

Assume that the spectral sensitivity of the camera is in a narrow band and is represented by a delta function having a peak in each of the red, green, and blue wavelength ranges. In this case, equation (9) is rewritten as $$\begin{cases} R_i = R'_{R_i} \cdot 10^{-A_{R_i}} \cdot \prod_{j=1}^{N} (k_{ji} P_{R_j}) \cdot \bar{r}_R \cdot WB_R \\ G_i = R'_{G_i} \cdot 10^{-A_{G_i}} \cdot \prod_{j=1}^{N} (k_{ji} P_{G_j}) \cdot \bar{r}_G \cdot WB_G \\ B_i = R'_{B_i} \cdot 10^{-A_{B_i}} \cdot \prod_{j=1}^{N} (k_{ji} P_{B_j}) \cdot \bar{r}_R \cdot WB_B \end{cases} \quad (10)$$

The wavelength signal values $R_i$, $G_i$ and $B_i$ of the target pixel i are given by equation (10).

$R'_{Ri}$, $R'_{Gi}$, and $R'_{Bi}$ of equation (10) are the elements of the spectral reflectance $R_i'(\lambda)$ of the skin without a pigment component accumulated at the peak wavelength of the spectral sensitivity of the camera, $P_{Rj}$, $P_{Gj}$, and $P_{Bj}$ are the elements of the spectral distribution $P_j(\lambda)$ of the illumination at the peak wavelength of the spectral sensitivity of the camera, and $A_{Ri}$, $A_{Gi}$, and $A_{Bi}$ are the elements of the absorption coefficient $A_i(\lambda)$ of a pigment component accumulated in the skin at the pixel position i at the peak wavelength of the spectral sensitivity of the camera. Similarly, representative signal values $R_{ave}$, $G_{ave}$, and $B_{ave}$ are given by $$\begin{cases} R_{ave} = R'_{R_{ave}} \cdot 10^{-A_{R_{ave}}} \cdot \prod_{j=1}^{N} (k_{jave} P_{R_j}) \cdot \bar{r}_R \cdot WB_R \\ G_{ave} = R'_{G_{ave}} \cdot 10^{-A_{G_{ave}}} \cdot \prod_{j=1}^{N} (k_{jave} P_{G_j}) \cdot \bar{r}_G \cdot WB_G \\ B_{ave} = R'_{B_{ave}} \cdot 10^{-A_{B_{ave}}} \cdot \prod_{j=1}^{N} (k_{jave} P_{B_j}) \cdot \bar{r}_R \cdot WB_B, \end{cases} \quad (11)$$

where $R'_{ave}$, $G'_{ave}$, and $B'_{ave}$ are the elements of the spectral reflectance $R_{ave}'(\lambda)$ of the skin in a pixel having the representative signal values at the peak wavelength of the spectral sensitivity of the camera, and $A_{Rave}$, $A_{Gave}$, and $A_{Bave}$ are the elements of the absorption coefficient $A_{ave}(\lambda)$ of a pigment component accumulated in the skin at the pixel position having the representative signal values at the peak wavelength of the spectral sensitivity of the camera.

Next, the ratio of the wavelength signal value of the target pixel i to the determined representative signal value is calculated for each of the RGB signals, thereby obtaining the light attenuation amount. When the illumination condition is assumed to be constant on the target pixel i and on the local region around it, approximation can be done to $k_{ji} = k_{jave}$ ($1 \le j \le N$). In addition, assume that the area of the portion where a pigment component is exclusively accumulated is smaller than the area of the local region, and the ratio of pixels without a pigment component accumulated is much higher than the ratio of pixels with a pigment component accumulated in the local region. In this case, the influence of the pigment component on the representative signal value is sufficiently small. Hence, $A_{Rave}$, $A_{Gave}$, and $A_{Bave}$ of equation (11) can be neglected, that is, set to zero. In addition, in the local region that is a small region, the spectral reflectance of the skin without a pigment component accumulated is almost constant. That is, the spectral reflectances $R'_{Ri}$, $R'_{Gi}$, and $R'_{Bi}$ equal the spectral reflectances $R'_{Rave}$, $R'_{Gave}$, and $R'_{Bave}$, respectively. Hence, when three equations (11) are divided by three equations (10), respectively, and the logarithms on both sides of each equation are taken, we obtain $$\begin{cases} A_{R_i} = -\log_{10}(R_i/R_{ave}) \\ A_{G_i} = -\log_{10}(G_i/G_{ave}) \\ A_{B_i} = -\log_{10}(B_i/B_{ave}), \end{cases} \quad (1)$$

$$A_i = (A_{R_i}, A_{G_i}, A_{B_i}). \quad (2)$$

The vector $A_i$ given by equation (2) represents the absorption coefficient of the pigment component at the pixel position i. The light attenuation amount calculation unit 102 passes the absorption coefficient calculated in accordance with equations (1) to the pigment amount calculation unit 103 as the light attenuation amount 152. As is apparent from equations (1), the calculated absorption coefficient (that is, the light attenuation amount) $A_i$ is robust to the influence of the individual difference ($R_i'(\lambda)$) of the skin color, illumination light of the image capturing environment represented by $$\prod_{j=1}^{N} (k_{ji} P_j) \quad (12)$$

and the characteristics (spectral sensitivity and white balance) of the used camera. Hence, the light attenuation amount calculation unit 102 can calculate the light attenuation amount without grasping the object, the image capturing environment, and the camera characteristics.

In step S203 of FIG. 2, the pigment amount calculation unit 103 calculates the pigment amount of the predetermined pigment component at the pixel position i based on the light attenuation amount calculated in step S202. The pigment amount can be obtained by resolving the light attenuation amount 152 using an absorbance base $e_{pig}$ (given by equation (13)) of the predetermined pigment component.

$$e_{Pig} = (e_{Pig\,R}, e_{Pig\,G}, e_{Pig\,B}) \quad (13)$$

The absorbance base $e_{pig}$ of a pigment component is the molar extinction coefficient of the pigment component at an assumed camera sensitivity peak position. The absorption characteristic of a pigment component included in human skin is described in Anderson, R. R., Parrish, J. A., "The Optics of Human Skin", Journal of Invest Dermatol, vol. 77(1), pp. 13-19, July, 1981. The absorption characteristic of a pigment component changes depending on the type. A melanin pigment is a pigment component produced in a melanocyte and gives the skin a dark brown color. The melanin pigment exhibits a high absorption coefficient in all wavelength ranges, and the absorption coefficient monotonically decreases from the short wavelength range to the long wavelength range. An oxy-hemoglobin pigment and a deoxy-hemoglobin pigment are pigments included in blood and give the skin a red color. Arteries include a large amount of oxy-hemoglobin pigments, and veins include a large amount of deoxy-hemoglobin pigments. Both the oxy-hemoglobin pigment and the deoxy-hemoglobin pigment exhibit steep and very high absorption coefficients in a short wavelength range of 400 to 450 nm and also exhibit relatively high absorption coefficients even in a middle wavelength range of 500 to 600 nm. The oxy-hemoglobin pigment and the deoxy-hemoglobin pigment are different in that they have different peak wavelength positions in the short wavelength range, and a w-type absorption characteristic that is observed in the middle wavelength range with respect to the oxy-hemoglobin pigment is not observed for the deoxy-hemoglobin pigment. A bilirubin pigment is contained in blood and gives the skin a yellow color. The bilirubin pigment exhibits a high absorption coefficient at 450 nm.

Note that to make the pigment amount estimation error caused by the difference between the spectral sensitivity of the assumed camera and that of the camera used at the time of image capturing robust, the absorbance base $e_{Pig}$ may be calculated from the weighted average value of the molar extinction coefficients near the peak wavelength range of the camera sensitivity.

The pigment amount calculation unit 103 resolves the light attenuation amount 152 by the absorbance base $e_{pig}$, thereby calculating the pigment amount. Let $e_k$ be the absorbance base of the $k^{th}$ pigment component out of M predetermined pigment components, and $\alpha_{ki}$ be the pigment amount of the pixel. The absorption coefficient $A_i$ of the pigment component accumulated in the skin of the pixel i is given by $$A_i = \sum_{k=1}^{M} \alpha_{ki} e_k + \varepsilon_i, \quad (14)$$

$$\varepsilon = (\varepsilon_R, \varepsilon_G, \varepsilon_B). \quad (15)$$

A vector $\varepsilon$ given by equation (15) is an error term including a resolution error produced by the pigment components other than the predetermined pigment component accumulated in the skin of the pixel i and a resolution error produced by an illumination change caused by very small unevenness of the skin surface in the local region. The first, second, and third elements of the vector $\varepsilon$ correspond to the components in the red, green, and blue wavelength ranges, respectively. The pigment amount calculation unit 103 calculates the pigment amount by obtaining $\alpha_{ki}$ that minimizes the magnitude $\|\varepsilon_i\|$ of the error term, which is given by $$\|\varepsilon_i\| = \sqrt{\left(\log_{10}(Y_i/Y_{ave}) - \sum_{k=1}^{M}\alpha_{ki}e_k\right)^2}, \quad (16)$$

where M is an integer that satisfies $1 \leq M \leq 3$, and $\alpha_{ki} \geq 0$.

Figure 4:
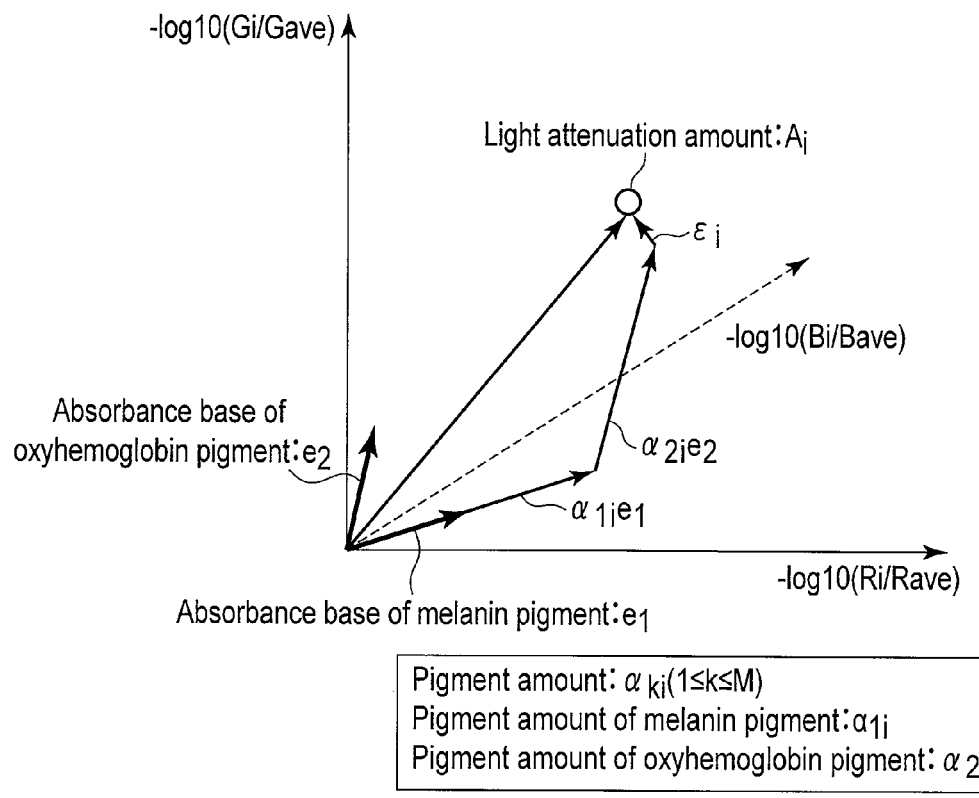
FIG. 4 is a view for explaining a method of calculating, at a pigment amount calculation unit shown in FIG. 1, a pigment amount by resolving a light attenuation amount by an absorbance base.

FIG. 4 shows a state in which the light attenuation amount resolved by the absorbance bases of two pigment components (melanin pigment and oxy-hemoglobin pigment), thereby estimating the pigment amount. To obtain $\alpha_{ki}$ that minimizes the magnitude $\|\varepsilon_i\|$ of the error term, for example, a predetermined algorithm of nonlinear programming can be used. The optimum solution of $\alpha_{ki}$ can be obtained using the gradient descent method or the Newton's method.

In the above-described way, the image processing apparatus 100 can calculate the pigment amount of a predetermined pigment component for each pixel of image data without using information of the object, the image capturing environment, and the camera characteristics. That is, the image processing apparatus 100 can estimate the pigment amount of the predetermined pigment component from image data captured by an arbitrary camera under a general environment.

Note that the pigment components that can be estimated are not limited to the major pigment components of the skin, that is, the melanin pigment, the oxy-hemoglobin pigment, the deoxy-hemoglobin pigment, and the bilirubin pigment and may include other pigment components having known absorption characteristics. The number M of pigment components can be either of 1, 2, and 3.

As described above, the image processing apparatus according to the present embodiment calculates the light attenuation amount at the target pixel position based on the ratio of the wavelength signal value of the target pixel to the representative signal value of the local region around the target pixel, and resolves the light attenuation amount by the absorbance base of each predetermined pigment component, thereby calculating the pigment amount of the predetermined pigment component. This makes it possible to estimate, from image data captured under a general environment, the pigment amount of a desired pigment component out of the pigment components accumulated in the skin of the object.

(Second Embodiment)

The second embodiment is different from the first embodiment in that the size of the local region used to calculate the light attenuation amount is changed in accordance with the target pixel.

Figure 5:
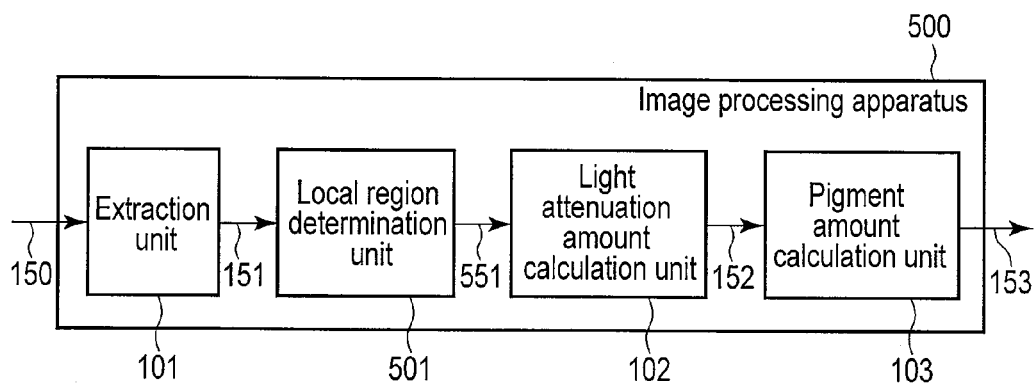
FIG. 5 is a block diagram schematically showing an image processing apparatus according to the second embodiment.

FIG. 5 schematically shows an image processing apparatus 500 according to the second embodiment. The image processing apparatus 500 shown in FIG. 5 includes a local region determination unit 501 in addition to the arrangement of the image processing apparatus 100 shown in FIG. 1. In the present embodiment, an extraction unit 101 passes a wavelength signal value 151 to the local region determination unit 501. The local region determination unit 501 determines the local region to be used to calculate the light attenuation amount of the target pixel using the wavelength signal value 151. The local region determination unit 501 passes information 551 representing the determined local region to a light attenuation amount calculation unit 102. The light attenuation amount calculation unit 102 calculates a representative signal value from a pixel in the local region specified by the local region information 551.

Figure 6:
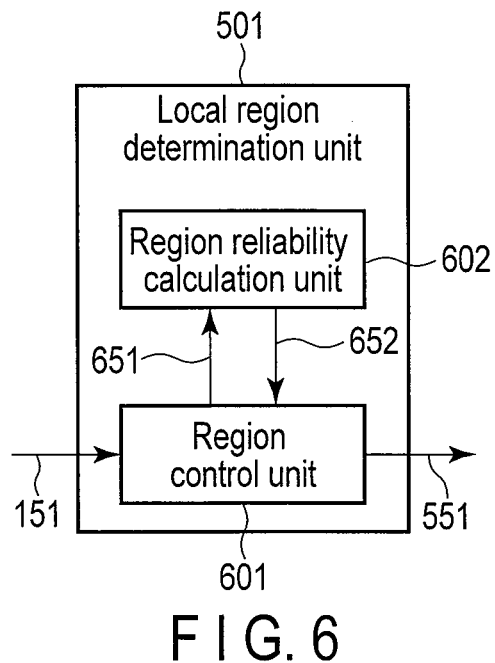
FIG. 6 is a block diagram showing details of a local region determination unit shown in FIG. 5.

FIG. 6 illustrates a configuration example of the local region determination unit 501 in detail. As shown in FIG. 6, the local region determination unit 501 includes a region control unit 601 and a region reliability calculation unit 602. The region control unit 601 controls the local region to be used to calculate the light attenuation amount of the target pixel based on a region reliability calculated by the region reliability calculation unit 602. More specifically, the local region determination unit 501 repeats the following steps until the control region is optimized, and determines the optimized control region as the local region.

That is, the region control unit 601 first selects a local region candidate from image data 150 as a control region, and passes information 651 representing the control region to the region reliability calculation unit 602. The region reliability calculation unit 602 calculates the reliability of the control region represented by the control region information 651 from the region control unit 601, and passes information 652 representing the calculated reliability to the region control unit 601. The region control unit 601 updates the control region based on the reliability information 652, and passes the information 651 representing the updated control region to the region reliability calculation unit 602.

The region reliability indicates the intensity change amount of the illumination in the control region and the shape change amount of the skin surface in the control region. As the region reliability, for example, the reciprocal of the standard deviation of the wavelength signal values held by a pixel in the control region, the ratio of non-edge pixels in the control region, or a sum or product thereof is usable. In either case, an R signal value that is a long wavelength signal with a minimum signal change caused by a pigment component is preferably used to calculate the region reliability. Selecting a region having a high region reliability as the local region allows to estimate the pigment amount while suppressing the influence of the difference in the skin region size by the image capturing magnification and the distance from the object at the time of image capturing and the area of the pigment component accumulation range.

One of the three methods to be exemplified below or any other method is usable as the control region optimization method.

(A) A method of gradually reducing the area of the control region until the region reliability exceeds a preset threshold.

(B) A method of, in the method (A), gradually increasing the area of the control region up to a limit where the region reliability falls below a threshold.

(C) A method of generating a plurality of control regions by enlarging or reducing a reference control region at an arbitrary magnification and determining, out of these control regions, a control region having the maximum region reliability as the optimum control region.

The control region can be set by an arbitrary method. The control region is preferably set as a square region centered around the target pixel or a rectangular region having a short side in the gradient direction of the target pixel and a long side in a direction perpendicular to the gradient direction. When the control region is set as a rectangular region having a short side in the gradient direction and a long side in a direction perpendicular to the gradient direction, for example, the area of the rectangular region is maintained constant, and the ratio of the long side to the short side is changed in proportion to the gradient strength, thereby setting the reference control region.

The relationship between the control region and the region reliability calculated for the region will be described with reference to FIGS. 7A and 7B.

FIG. 7A shows a partial region 701 that is part of the image data 150. In FIG. 7A, a signal change is expressed by gradation. A plurality of control regions 711 to 716 around a target pixel 702 are illustrated. The target pixel 702 is located in a human skin region (also referred to as a pigment accumulation region) 704 where a pigment is accumulated. Each of the control regions 711 to 716 has a short side in the gradient direction indicated by an arrow 703 and a long side in a direction perpendicular to the gradient direction. The ratio of the short side and the long side is identical in all the control regions. FIG. 7B shows the region reliabilities calculated for the control regions 711 to 716. In each of the control regions 711 and 712 having small areas, the region reliability is low because of the influence of the pigment accumulation region 704. In each of the control regions 715 and 716 having large areas, the region reliability is low because a region with a large signal change is included. The region reliability of the control region 713 is relatively high. The control region 714 has the maximum region reliability. In the example shown in FIG. 7A, the control region 714 is selected as the optimum local region.

Figure 8:
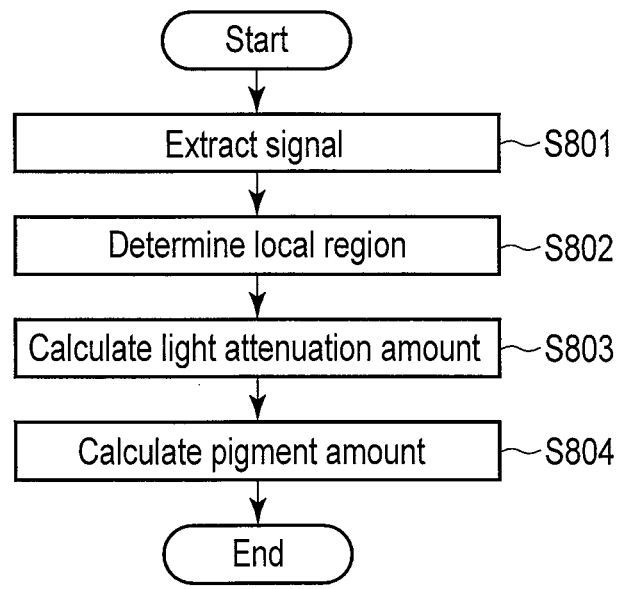
FIG. 8 is a flowchart showing an example of the operation of the image processing apparatus shown in FIG. 5.

FIG. 8 shows an example of the operation of the image processing apparatus 500. The processes in steps S801, S803, and S804 of FIG. 8 are the same as those in steps S201, S202, and S203 of FIG. 2, respectively, and a detailed description thereof will be omitted.

In step S801, the extraction unit 101 extracts the wavelength signal value 151 from the image data 150 for each pixel. In step S802, the local region determination unit 501 determines, based on the region reliability, the local region to be used to calculate the light attenuation amount of the target pixel. More specifically, the local region determination unit 501 determines the local region in accordance with one of the above-described methods. The local region determination unit 501 passes the local region information 551 representing the determined local region to the light attenuation amount calculation unit 102.

In step S803, the light attenuation amount calculation unit 102 calculates the light attenuation amount based on the ratio of the wavelength signal value of the target pixel to the representative signal value of the local region specified by the local region information 551. In step S804, a pigment amount calculation unit 103 resolves the light attenuation amount using the absorbance base of a predetermined pigment component, thereby calculating the pigment amount of the predetermined pigment component.

As described above, the image processing apparatus according to the present embodiment controls the local region in accordance with the target pixel, thereby calculating the pigment amount of each predetermined pigment component independently of the difference in the skin region size by the image capturing magnification and the distance from the object and the area of the pigment component accumulation range.

(Third Embodiment)

The third embodiment is different from the first embodiment in that a human skin region is detected from image data 150, and the image region to be processed is limited to the detected human skin region.

Figure 9:
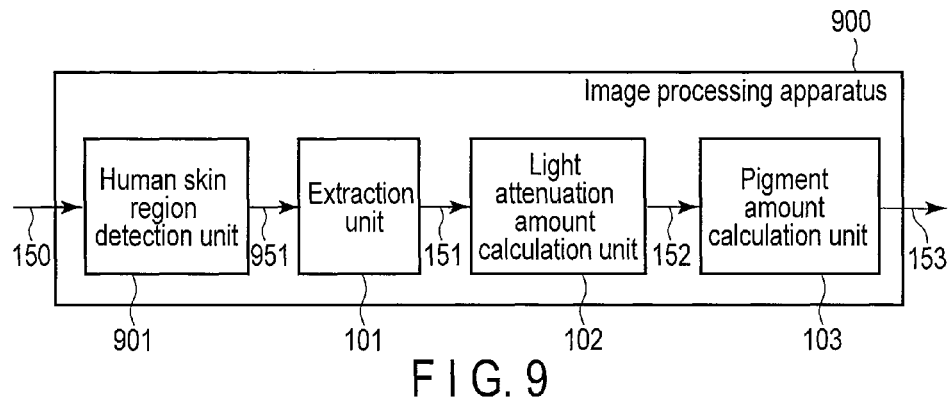
FIG. 9 is a block diagram schematically showing an image processing apparatus according to the third embodiment.

FIG. 9 schematically shows an image processing apparatus 900 according to the third embodiment. The image processing apparatus 900 shown in FIG. 9 includes a human skin region detection unit 901 in addition to the arrangement of the image processing apparatus 100 shown in FIG. 1. In the present embodiment, the image data 150 is supplied to the human skin region detection unit 901. The human skin region detection unit 901 detects a human skin region in the image data 150, and passes, to an extraction unit 101, a human skin region 951 that is the image data of the detected human skin region. The extraction unit 101 extracts a wavelength signal value 151 of each pixel in the human skin region detected by the human skin region detection unit 901.

Figure 10:
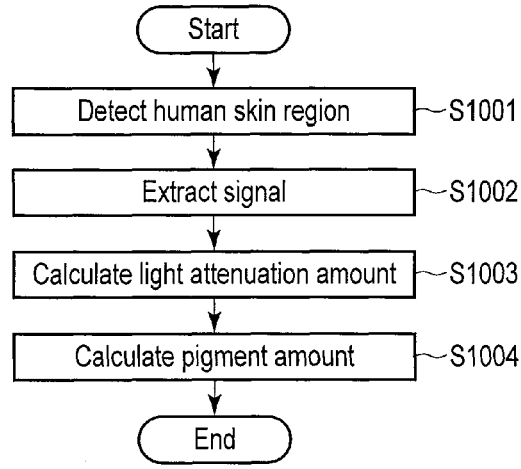
FIG. 10 is a flowchart showing an example of the operation of the image processing apparatus shown in FIG. 9.

FIG. 10 shows an example of the operation of the image processing apparatus 900. The processes in steps S1002, S1003, and S1004 of FIG. 10 are the same as those in steps S201, S202, and S203 of FIG. 2, respectively, and a detailed description thereof will be omitted.

In step S1001, the human skin region detection unit 901 detects a human skin region in the image data 150. The human skin region detection unit 901 first detects a face region in the image data 150. To detect a face region, an existing face detection method is usable. In the present embodiment, used is a face detection method described in, for example, Mita, T., et al. "Joint Haar-like Features for Face Detection", Proceedings of the IEEE International Conference on Computer Vision II, art. no. 1544911, pp. 1619-1626 (2005). In the existing face region detection, since a face is detected as a rectangular region, the detected face region includes a background region that is a non-skin region. Next, the human skin region detection unit 901 performs skin detection in the detected face region to remove the non-skin region from the detected face region. To detect skin, an existing skin detection method is usable. In the present embodiment, used is a skin detection method described in, for example, Phung, S. L., et al. "Skin Segmentation using Color Pixel Classification: Analysis and Comparison", IEEE Transactions on Pattern Analysis and Machine Intelligence 27 (1), pp. 148-154. (2005). Finally, the human skin region detection unit 901 removes an edge region from the detected skin region, thereby determining the human skin region to estimate the pigment amount. As for the edge region, an edge is detected in an image obtained by reducing the image data 150 at an arbitrary magnification, and, out of the skin region, a region corresponding to the edge region detected in the reduced image is removed. To detect the edge of an image, an existing edge detection filter such as a Roberts filter is usable. The reduction magnification is preferably set in accordance with the number of pixels of the detected face region or skin region. For example, the reduction magnification is set to a value within the range of 1/2 to 1/20 in accordance with the size of the detected face region or skin region. The human skin region detection unit 901 passes the detected region to the extraction unit 101 as the human skin region 951.

In the present embodiment, an example in which the processing target is a face has been described. However, when the processing target is not limited to a face, and the pigment amount is to be estimated for the whole human skin as the processing target, skin region detection at the subsequent stage is executed without executing face detection at the preceding stage.

In step S1002, the extraction unit 101 extracts, from the human skin region 951, the wavelength signal value 151 of each pixel in the human skin region 951. In step S1003, a light attenuation amount calculation unit 102 calculates a light attenuation amount 152 at the target pixel position based on the ratio of the wavelength signal value of the target pixel to the representative signal value of a local region around the target pixel. In step S1004, a pigment amount calculation unit 103 resolves the light attenuation amount 152 using the absorbance base of a predetermined pigment component, thereby calculating a pigment amount 153 of each predetermined pigment component. In the present embodiment, the pixel region of the processing target is limited to a human skin region. This allows to decrease the number of pixels to be processed and consequently reduce the calculation cost in the extraction unit 101, the light attenuation amount calculation unit 102, and the pigment amount calculation unit 103.

As described above, the image processing apparatus according to the present embodiment defects a human skin region from image data, thereby performing pigment amount estimation processing only for the human skin region in the image data. This allows the calculation cost to be reduced.

(Fourth Embodiment)

The fourth embodiment is different from the first embodiment in that an image in which the pigment amount of a predetermined pigment component has been adjusted is generated from image data 150.

Figure 11:
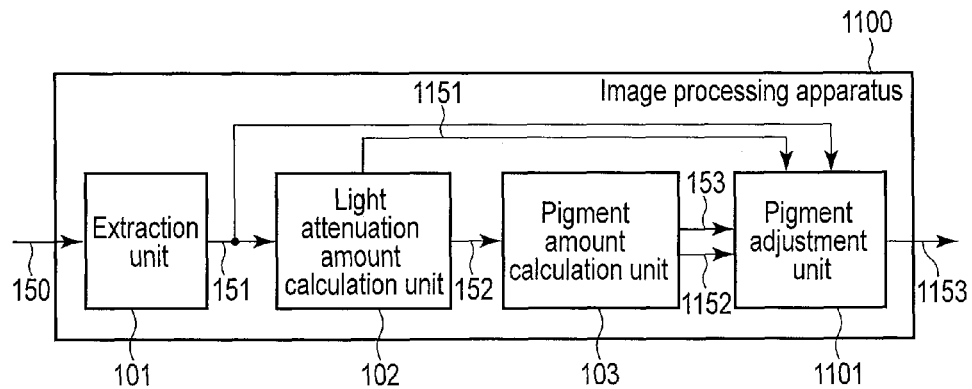
FIG. 11 is a block diagram schematically showing an image processing apparatus according to the fourth embodiment.

FIG. 11 schematically shows an image processing apparatus 1100 according to the fourth embodiment. The image processing apparatus 1100 shown in FIG. 11 includes a pigment adjustment unit 1101 in addition to the arrangement of the image processing apparatus 100 shown in FIG. 1. The image processing apparatus 1100 acquires the image data 150 that is an image content including a human skin region, and outputs a pigment adjusted image 1153 in which the pigment amount of a predetermined pigment component has been adjusted for each pixel in the image data 150.

In the present embodiment, an extraction unit 101 passes a wavelength signal value 151 to a light attenuation amount calculation unit 102 and the pigment adjustment unit 1101. The light attenuation amount calculation unit 102 passes a representative signal value 1151 of a local region around the target pixel to the pigment adjustment unit 1101. A pigment amount calculation unit 103 passes an error produced at the time of resolution to the pigment adjustment unit 1101 as a pigment error 1152 together with a pigment amount 153 of the target pixel. Based on the representative signal value 1151, the pigment amount 153, the pigment error 1152, and the absorbance base of a predetermined pigment component, the pigment adjustment unit 1101 generates the pigment adjusted image 1153 in which the pigment amount of a predetermined pigment component is adjusted.

FIG. 12 shows an example of the operation of the image processing apparatus 1100. The processes in steps S1201, S1202, and S1203 of FIG. 12 are the same as those in steps S201, S202, and S203 of FIG. 2, respectively, and a detailed description thereof will be omitted.

In step S1201, the extraction unit 101 extracts the wavelength signal values 151 from the image data 150 for the respective pixels. The extraction unit 101 passes the wavelength signal values 151 to the light attenuation amount calculation unit 102 and the pigment adjustment unit 1101. In step S1202, the light attenuation amount calculation unit 102 calculates a light attenuation amount 152 of the target pixel from the wavelength signal values 151 received from the extraction unit 101. The light attenuation amount calculation unit 102 first calculates the representative signal value 1151 of the local region around the target pixel. Next, the light attenuation amount calculation unit 102 calculates the light attenuation amount 152 based on the ratio of the wavelength signal value of the target pixel to the calculated representative signal value 1151 in accordance with, for example, equations (1). The light attenuation amount calculation unit 102 passes the calculated representative signal value 1151 to the pigment adjustment unit 1101, and passes the calculated light attenuation amount 152 to the pigment amount calculation unit 103.

In step s1203, the pigment amount calculation unit 103 resolves the light attenuation amount 152 using the absorbance base of a predetermined pigment component, thereby calculating the pigment amount 153 of the predetermined pigment component of the target pixel. The pigment amount calculation method is the same as that described with respect to step S203. Let M be the number of predetermined pigment components, $e_k$ be the absorbance base of the $k^{th}$ pigment component, and $\alpha_{ki}$ be the pigment amount of the pigment component. M is 1, 2, or 3, and k is an integer that satisfies $1 \leq k \leq M$. The pigment amount calculation unit 103 obtains appropriate $\alpha_{ki}$ that minimizes an error $\|\epsilon_i\|$ of equation (16), thereby calculating the pigment amount of the predetermined pigment component. When calculating the pigment amount, the error $\epsilon_i$ given by equation (15) is also obtained. This error will be referred to as a pigment error. The pigment error is an error term including a resolution error produced by the pigment components other than the predetermined pigment component accumulated in the skin at a pixel position i and a resolution error produced by an illumination change caused by very small unevenness of the skin surface in the local region. The pigment amount calculation unit 103 passes the pigment amount 153 and the pigment error 1152 to the pigment adjustment unit 1101.

In step S1204, the pigment adjustment unit 1101 generates the pigment adjusted image 1153 in which the pigment amount of the predetermined pigment component is adjusted based on the representative signal value 1151, the pigment amount 153, the pigment error 1152, and the absorbance base of the predetermined pigment component. For example, the pigment adjustment unit 1101 calculates a wavelength signal value $Y_i$ of the pixel i in the pigment adjusted image 1153 in accordance with $$\begin{bmatrix} R'_i \\ G'_i \\ B'_i \end{bmatrix} = \begin{bmatrix} R_{ave} \\ G_{ave} \\ B_{ave} \end{bmatrix} \times 10^{-\left(\sum_{k=1}^{M}\left(\beta_k \alpha_{ki} \begin{bmatrix} e_{kR} \\ e_{kG} \\ e_{kB} \end{bmatrix}\right) + \begin{bmatrix} \varepsilon_{Ri} \\ \varepsilon_{Gi} \\ \varepsilon_{Bi} \end{bmatrix}\right)}, \quad (17)$$

where $\beta_k$ is the adjustment coefficient of a pigment component, and k is an integer that satisfies $1 \leq k \leq M$. When the adjustment coefficient $\beta_k$ is set for each pigment component, a pigment adjusted image in which the pigment amount of a specific pigment component is adjusted can be obtained. The processes in steps S1202 to S1204 are executed for all pixels in the image data 150, thereby generating the pigment adjusted image 1153.

In addition, when a threshold is set for each pigment component, the pigment amount at a pixel position where a specific pigment component remarkably concentrates can be adjusted. Let $\gamma_k$ be the threshold with respect to the $k^{th}$ pigment component. The wavelength signal value of the pigment adjusted image can be calculated by, for example, $$\begin{bmatrix} R'_i \\ G'_i \\ B'_i \end{bmatrix} = \begin{bmatrix} R_{ave} \\ G_{ave} \\ B_{ave} \end{bmatrix} \times 10^{-\left(\sum_{k=1}^{M}\left(\alpha'_{ki} \begin{bmatrix} e_{kR} \\ e_{kG} \\ e_{kB} \end{bmatrix}\right) + \begin{bmatrix} \varepsilon_{Ri} \\ \varepsilon_{Gi} \\ \varepsilon_{Bi} \end{bmatrix}\right)}, \quad (18)$$

for $\alpha'_{ki} = \begin{cases} \text{if } \alpha_{ki} \geq \gamma_k & \gamma_k \\ \text{else} & \alpha_{ki} \end{cases}.$ As described above, according to the image processing apparatus of the present embodiment, it is possible to generate a pigment adjusted image in which the pigment amount of a predetermined pigment component accumulated in the skin corresponding to the pixel position i of image data is arbitrarily adjusted. For example, the pigment adjusted image can be an image from which a pigment component is removed or an image in which a pigment component is enhanced.

(Fifth Embodiment)

The fifth embodiment is different from the first embodiment in that the attenuation of light reflected by a skin surface includes the influence of reflection by microsurfaces of the skin surface as well as absorption by a pigment component.

FIG. 13 schematically shows an image processing apparatus 1300 according to the fifth embodiment. As shown in FIG. 13, the image processing apparatus 1300 includes an extraction unit 101, a light attenuation amount calculation unit 102, and a pigment amount calculation unit 1301. The pigment amount calculation unit 1301 resolves a light attenuation amount 152 using the absorbance base of a predetermined pigment component and the geometric change amount, thereby calculating a pigment amount 153 of the predetermined pigment component. The geometric change amount indicates the change amount of light reflected by very small unevenness of the skin surface.

The operation of the image processing apparatus 1300 will be described next.

FIG. 14 shows an example of the operation of the image processing apparatus 1300. The processes in steps S1401 and S1402 FIG. 14 are the same as those in steps S201 and S202 of FIG. 2, respectively, and a detailed description thereof will be omitted. In step S1401, the extraction unit 101 extracts wavelength signal values 151 from image data 150 for each pixel. In step S1402, the light attenuation amount calculation unit 102 calculates the light attenuation amount 152 based on the ratio of the wavelength signal value of the target pixel to the representative signal value of a local region around the target pixel.

In step S1403, the pigment amount calculation unit 1301 resolves the light attenuation amount 152 using the absorbance base of a predetermined pigment component and the geometric change amount, thereby calculating the pigment amount 153 of the predetermined pigment component. In the present embodiment, used is a model generated by adding the influence of the microsurfaces of the skin surface to the above-described light reflection model.

Figure 15:
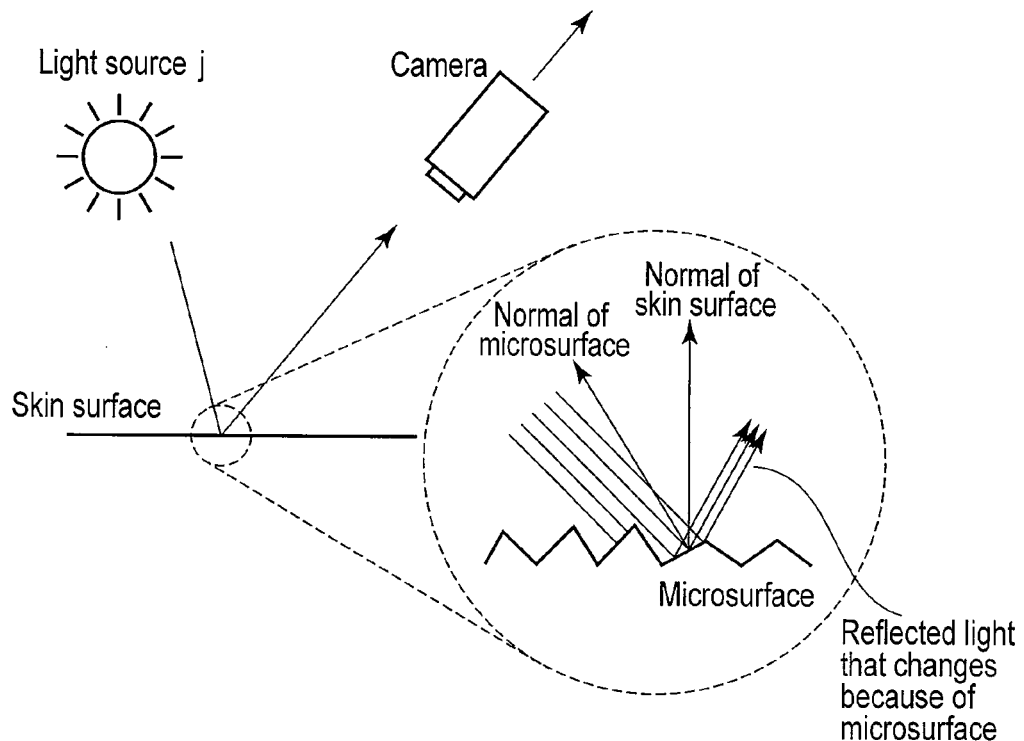
FIG. 15 is a view showing light shielding and a normal change by microsurfaces of a skin surface.

The light reflection model according to the present embodiment will be explained with reference to FIG. 15. FIG. 15 schematically illustrates a state in which light is reflected by microsurfaces of a skin surface. As shown in FIG. 15, the skin surface includes very small unevenness, and microsurfaces formed by the very small unevenness have different normals. In the light reflection model according to the present embodiment, the intensity of reflected light changes because of such a variation in the normal. In addition, the intensity of reflected light also changes when the light is shielded by an adjacent microsurface. A signal obtained by causing the camera to observe the light reflected by the microsurface is represented by $$\begin{bmatrix} R_i \\ G_i \\ B_i \end{bmatrix} = \int vis R'_i(\lambda) \cdot 10^{-A_i(\lambda)} \cdot \prod_{j=1}^{N} (g_i k_{ji} P_j(\lambda)) \cdot \begin{bmatrix} \bar{r}_R(\lambda) \cdot WB_R \\ \bar{r}_G(\lambda) \cdot WB_G \\ \bar{r}_B(\lambda) \cdot WB_B \end{bmatrix} d\lambda, \quad (19)$$

where $g_i$ represents the geometric change amount which is a coefficient representing the change in the reflected light intensity caused by the microsurfaces of the skin surface. The subscript i indicates a coefficient at a pixel position i. The change in the reflected light intensity caused by the microsurfaces of the skin surface includes the change in the reflected light intensity caused by the variation in the normals of the microsurfaces of the skin surface and the change in the reflected light intensity caused by light shielding by adjacent microsurfaces. The coefficient $g_i$ is added to equation (19), as compared to equation (9).

Assume that the spectral sensitivity of the camera is in a narrow band and is represented by a delta function having a peak in each of the red, green, and blue wavelength ranges. In this case, equation (19) is rewritten as $$\begin{cases} R_i = R'_{R_i} \cdot 10^{-A_{R_i}} \cdot \prod_{j=1}^{N} (g_i k_{ji} P_{R_j}) \cdot \bar{r}_R \cdot WB_R \\ G_i = R'_{G_i} \cdot 10^{-A_{G_i}} \cdot \prod_{j=1}^{N} (g_i k_{ji} P_{G_j}) \cdot \bar{r}_G \cdot WB_G \\ B_i = R'_{B_i} \cdot 10^{-A_{B_i}} \cdot \prod_{j=1}^{N} (g_i k_{ji} P_{B_j}) \cdot \bar{r}_B \cdot WB_B. \end{cases} \quad (20)$$

When equations (20) are divided by equations (11), respectively, and the logarithms on both sides of each equation are taken, we obtain $$\begin{cases} -\log_{10}(R_i/R_{ave}) = A_{R_i} - \log_{10}(g_i) \\ -\log_{10}(G_i/G_{ave}) = A_{G_i} - \log_{10}(g_i) \\ -\log_{10}(B_i/B_{ave}) = A_{B_i} - \log_{10}(g_i), \end{cases} \quad (21)$$

$$A_i = (A_{R_i}, A_{G_i}, A_{B_i}). \quad (22)$$

The illumination condition is assumed to be constant on the target pixel i and on the local region around it, and the influence of the pigment component on the representative signal value is assumed to be sufficiently small, as described with respect to step S202.

A vector $A_i$ given by equation (22) represents the absorption coefficient of the pigment component accumulated in the skin at the pixel position i. Equations (21) can be expressed as $$-\log_{10}(Y_i/Y_{ave}) = A_i - \log_{10}(g_i)I, \quad (23)$$

$$Y_i = (R_i, G_i, B_i) \quad (24)$$

$$Y_{ave} = (R_{ave}, G_{ave}, B_{ave}) \quad (25)$$

A vector I in equation (23) is the unit vector. The left-hand side of equation (23) corresponds to the light attenuation amount 152 calculated in step S1402. The light attenuation amount 152 includes the absorption coefficient representing the light attenuation amount by the pigment component and the amount of the reflected light intensity change caused by the microsurfaces.

The pigment amount calculation unit 1301 calculates the pigment amount 153 and a geometric change amount 1351 of the predetermined pigment component from the light attenuation amount 152. Let $e_k$ be the absorbance base of the $k^{th}$ pigment component out of M predetermined pigment components to be calculated, and $\alpha_{ki}$ be the pigment amount. The absorption coefficient $A_i$ of the pigment component accumulated in the skin of the pixel i is given by $$A_i = \sum_{k=1}^{M} \alpha_{ki} e_k + \varepsilon_i, \quad (26)$$

$$\varepsilon_i = (\varepsilon_{iR}, \varepsilon_{iG}, \varepsilon_{iB}) \quad (27)$$

where M is 1 or 2, and $\alpha_{ki} \geq 0$. A vector $\epsilon_i$ given by equation (27) is an error term including a resolution error produced when a pigment component other than the image data is accumulated in the skin of the pixel i. When equation (26) is substituted into equation (23), we obtain $$-\log_{10}(Y_i/Y_{ave}) = \sum_{k=1}^{M} (\alpha_{ki} e_k) - \log_{10}(g_i)I + \varepsilon_i. \quad (28)$$

The pigment amount 153 of each pigment component and the geometric change amount 1351 are calculated by obtaining $\alpha_{ki}$ and $g_i$ that minimize the magnitude $\|\epsilon_i\|$ of the error term. More specifically, the pigment amount calculation unit 1301 searches for $\alpha_{ki}$ and $g_i$ that minimize the magnitude $\|\epsilon_i\|$ of the error term, as indicated by $$\|\varepsilon_i\| = \sqrt{\left(\log_{10}(Y_i/Y_{ave}) - \sum_{k=1}^{M}(\alpha_{ki}e_k) + \log_{10}(g_i)I\right)^2}, \quad (29)$$

where $\alpha_{ki} \geq 0$ and $g_i \geq 0$.

In the above-described way, the pigment amount 153 of a predetermined pigment component and the geometric change amount 1351 representing the change amount of the intensity of the light reflected by the very small unevenness of the skin surface (object surface) can be calculated.

Note that when generating a pigment amount adjusted image in which the pigment component of skin has been adjusted using the pigment amount calculated in the present embodiment, $\epsilon_i'$ given by $$\epsilon_i' = -\log_{10}(g_i)I + \epsilon_i \quad (30)$$

is handled as a pigment error, thereby generating a pigment adjusted image in which the pigment amount is adjusted while maintaining the unevenness of the skin surface.

As described above, the image processing apparatus according to the present embodiment resolves the light attenuation amount using the absorbance base of a predetermined pigment component and the geometric change amount, thereby estimating the pigment amount of the predetermined pigment component. This allows to accurately estimate the pigment amount of the predetermined pigment component without being affected by the very small unevenness of the skin surface.

The image processing apparatus according to each of the above-described embodiments can also be implemented by, for example, using a general-purpose computer apparatus as basic hardware. The programs to be executed by the processor of the computer apparatus are constituted as modules including the above-described functions. Detailed forms of distribution or integration of the apparatuses are not limited to those described above. All or some of them can be functionally or physical distributed or integrated in an arbitrary unit according to various load or use situations and the like. For example, the image data 150 may be acquired from another device using a communication method or acquired from a predetermined memory. The value of the pigment amount 153 or a density image reflecting the pigment amount 153 may be created and displayed, in a superimposed manner, at a corresponding portion of the image data 150 on the screen of the computer. A portion of the image data 150 where the pigment amount 153 is large or small may be selected and displayed. Each program may be recorded in a recording medium as a file of an installable or executable format and provided, or incorporated in a ROM or the like in advance and provided. As the recording medium, a computer-readable recording medium such as a magnetic disc, an optical disc (CD-ROM, CD-R, DVD, or the like), a magneto-optical disc (MO or the like), or a semiconductor memory is usable. The programs that implement the processing of the above-described embodiments may be stored on a computer (server) connected to a network such as the Internet, and a computer (client) may be caused to download the programs via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   processing circuitry configured to perform operations including:
   extract, from image data including a plurality of pixels, wavelength signal values of the plurality of pixels;
   calculate a light attenuation amount based on a ratio of a wavelength signal value of a target pixel to a representative signal value obtained from wavelength signal values of a local region around the target pixel; and
   calculate a pigment amount of a predetermined pigment component at the target pixel by resolving the light attenuation amount using an absorbance base of the predetermined pigment component.

2. The apparatus according to claim 1, wherein the processing circuitry is configured to resolve the light attenuation amount using the absorbance base and a geometric change amount representing an intensity change amount of light reflected by unevenness of an object surface.

3. The apparatus according to claim 1, wherein the processing circuitry is further configured to determine the local region based on a region reliability representing an intensity change amount of illumination and a shape change amount of an object surface.

4. The apparatus according to claim 3, wherein
   each of the wavelength signal values of the plurality of pixels includes a red signal value, a green signal value, and a blue signal value, and
   the processing circuitry is configured to calculate region reliabilities for one or more control regions based on a standard deviation of the red signal value, a ratio of non-edge pixels, or a sum or product thereof, and determine, as the local region, a control region which has a region reliability not less than a threshold, among the control regions.

5. The apparatus according to claim 1, wherein the processing circuitry is configured to set one of a pixel set including all pixels in the local region and, out of one or more pixel sets produced by clustering the pixels in the local region, a pixel set to which a pixel that matches a median value of the wavelength signal values in the local region belongs, and determine the representative signal value from an average value or a median value of wavelength signal values of the pixel set, or a peak value of a histogram for wavelength signal values of the pixel set.

6. The apparatus according to claim 1, wherein
   the processing circuitry is configured to calculate a pigment error produced by resolving the light attenuation amount by the absorbance base, and
   the processing circuitry is further configured to adjust the pigment amount of the predetermined pigment component in the target pixel based on the representative signal value, the absorbance base, the pigment amount, and the pigment error to generate a pigment adjusted image.

7. The apparatus according to claim 1, wherein the absorbance base is determined in advance from a value of a molar extinction coefficient of the predetermined pigment component at a peak wavelength of a spectral sensitivity of each chrominance signal of a camera.

8. The apparatus according to claim 1, wherein the predetermined pigment component includes at least one of a melanin pigment, an oxy-hemoglobin pigment, a deoxy-hemoglobin pigment, and a bilirubin pigment.

9. The apparatus according to claim 1, wherein the processing circuitry is further configured to detect a human skin region in the image data,
wherein the processing circuitry is configured to extract, from the image data, wavelength signal values of pixels included in the human skin region.

10. An image processing method comprising:
extracting, from image data including a plurality of pixels, wavelength signal values of the plurality of pixels;
calculating a light attenuation amount based on a ratio of a wavelength signal value of a target pixel to a representative signal value obtained from wavelength signal values of a local region around the target pixel; and
calculating a pigment amount of a predetermined pigment component at the target pixel by resolving the light attenuation amount using an absorbance base of the predetermined pigment component.

11. The method according to claim 10, wherein the calculating a pigment amount comprises resolving the light attenuation amount using the absorbance base and a geometric change amount representing an intensity change amount of light reflected by unevenness of an object surface.

12. The method according to claim 10, further comprising determining the local region based on a region reliability representing an intensity change amount of illumination and a shape change amount of an object surface.

13. The method according to claim 12, wherein
each of the wavelength signal values of the plurality of pixels includes a red signal value, a green signal value, and a blue signal value, and
the determining the local region comprises calculating region reliabilities for one or more control regions based on a standard deviation of the red signal value, a ratio of non-edge pixels, or a sum or product thereof, and determining, as the local region, a control region which has a region reliability not less than a threshold, among the control regions.

14. The method according to claim 10, wherein the calculating a light attenuation amount comprises setting one of a pixel set including all pixels in the local region and, out of one or more pixel sets produced by clustering the pixels in the local region, a pixel set to which a pixel that matches a median value of the wavelength signal values in the local region belongs, and determining the representative signal value from an average value or a median value of wavelength signal values of the pixel set, or a peak value of a histogram for wavelength signal values of the pixel set.

15. The method according to claim 10, wherein
the calculating a pigment amount comprises calculating a pigment error produced by resolving the light attenuation amount by the absorbance base, and
the method further comprises adjusting the pigment amount of the predetermined pigment component in the target pixel based on the representative signal value, the absorbance base, the pigment amount, and the pigment error to generate a pigment adjusted image.

16. The method according to claim 10, wherein the absorbance base is determined in advance from a value of a molar extinction coefficient of the predetermined pigment component at a peak wavelength of a spectral sensitivity of each chrominance signal of a camera.

17. The method according to claim 10, wherein the predetermined pigment component includes at least one of a melanin pigment, an oxy-hemoglobin pigment, a deoxy-hemoglobin pigment, and a bilirubin pigment.

18. The method according to claim 10, further comprising detecting a human skin region in the image data,
wherein the extracting wavelength signal values comprises extracting, from the image data, wavelength signal values of pixels included in the human skin region.

19. A non-transitory computer readable medium including computer executable instructions, wherein the instructions, when executed by a processor, cause the processor to perform at least:
extracting, from image data including a plurality of pixels, wavelength signal values of the plurality of pixels;
calculating a light attenuation amount based on a ratio of a wavelength signal value of a target pixel to a representative signal value obtained from wavelength signal values of a local region around the target pixel; and
calculating a pigment amount of a predetermined pigment component at the target pixel by resolving the light attenuation amount using an absorbance base of the predetermined pigment component.

* * * * *